United States Patent [19]

Hanatani et al.

[11] Patent Number: 4,683,967
[45] Date of Patent: Aug. 4, 1987

[54] WEIGHT MEASURING DEVICE

[75] Inventors: Sakio Hanatani, Takaichi; Tuguharu Yakushiji, Sakai, both of Japan

[73] Assignee: Sharp Kabushiki Kaisha, Osaka, Japan

[21] Appl. No.: 801,340

[22] Filed: Nov. 25, 1985

[30] Foreign Application Priority Data

Nov. 27, 1984 [JP] Japan ............................ 59-180511[U]
Dec. 14, 1984 [JP] Japan ............................ 59-190657[U]
Dec. 28, 1984 [JP] Japan ............................ 59-197514[U]

[51] Int. Cl.$^4$ ................ G01G 19/52; G01G 3/14; G01G 19/00; H05B 6/64
[52] U.S. Cl. .................... 177/144; 177/210 R; 177/245; 219/10.55 B
[58] Field of Search ............... 177/144, 210 R, 245; 219/10.55 B

[56] References Cited

U.S. PATENT DOCUMENTS 3,813,918  6/1974  Moe ............................... 177/144 X
4,390,768  6/1983  Teich et al. ..................... 177/144 X
4,512,431  4/1985  Bloomfield ...................... 177/210 R
4,521,658  6/1985  Wyland et al. ................... 177/144 X Primary Examiner—George H. Miller, Jr.
Attorney, Agent, or Firm—Birch, Stewart Kolasch & Birch

[57] ABSTRACT

A weight measuring device for a heating appliance includes a heating chamber holding an object to be heated therein, the heating chamber having a bottom plate, a turntable member upon which the an object is disposed for rotating the object, on an upper surface of the bottom plate of the heating chamber, the turntable means having rollers, the rollers providing a stress on the bottom plate by rotating itself, a piezoelectric transducer element disposed on the rear surface of the bottom plate of the heating chamber corresponding to the locus of at least one of the rollers, for outputting a voltage indicative of the weight of the object, a detecting circuit for detecting the voltage from the piezoelectric transducer element and a weight measuring circuit for measuring the weight of the object on the turntable based on the output of the detecting circuit.

34 Claims, 11 Drawing Figures

FIG. 4
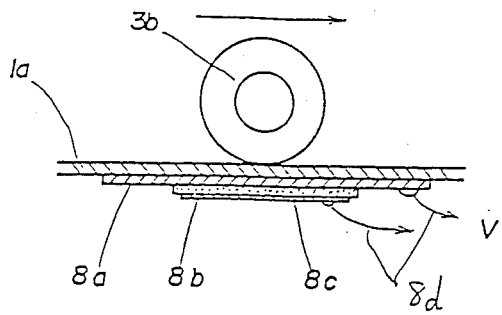
FIG. 5
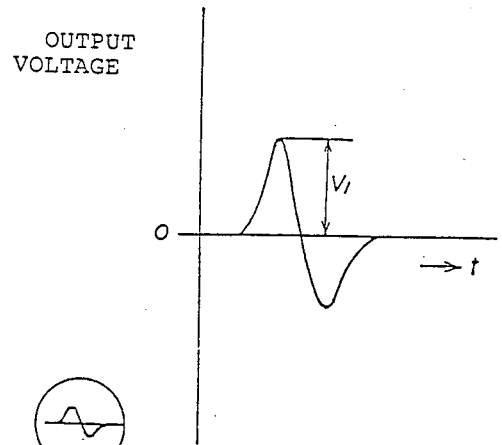
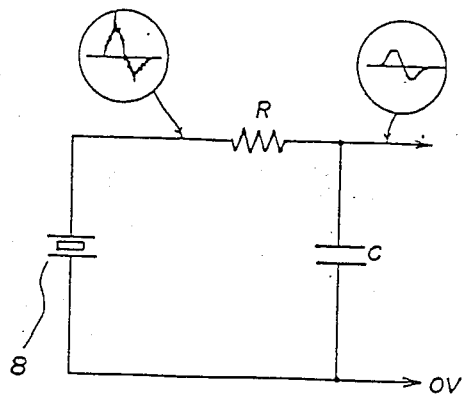
FIG. 6

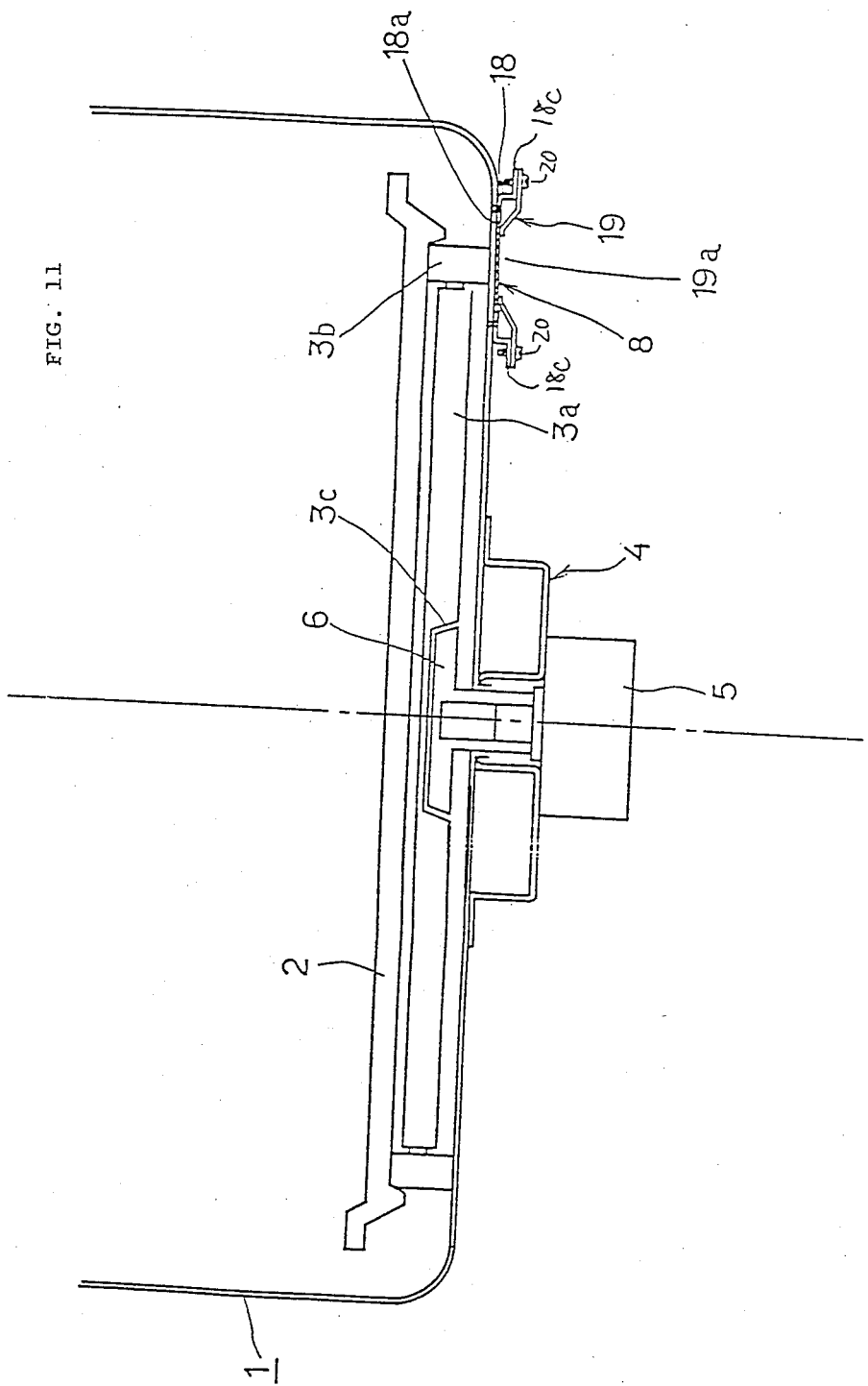

WEIGHT MEASURING DEVICE

BACKGROUND OF THE INVENTION

The present invention relates to a weight measuring device and, more particularly, to a weight measuring device, for a heating appliance such as a microwave oven, which measures a weight of an object by detecting a voltage produced from a piezoelectric transducer element.

A microwave oven including a weight measuring device has been developed for automatically heating a food based on the weight of the food. For example, a weight measuring device is disclosed in U.S. patent application Ser. No. 724,072 filed on Apr. 16, 1985, entitled "FOOD WEIGHT MEASURING DEVICE FOR COOKING APPLIANCE" by Taisuke MORINO et al. The British counterpart is application No. 8509781 filed on Apr. 17, 1985, and the counterpart in West Germany is application No. P3514505.6 filed on Apr. 20, 1985. In Ser. No. 724,072, the weight of the food is measured based on a change in an electrostatic capacity. However, a number of components for the weight measuring device may be for the assembly, thus requiring much labor for assembly, and making it difficult to reduce the costs. The components should be accurately assembled.

Accordingly, it is desired that a novel weight measuring device be provided to exactly measure the weight of the object based on the output of a piezoelectric transducer element, thereby reducing the number of components.

SUMMARY OF THE INVENTION

Accordingly, it is an object of the present invention to provide a weight measuring device which can exactly measure the weight of an object responsive to the output from a piezoelectric transducer element.

It is another object of the present invention to provide a weight measuring device which detects and measures the weight of an object disposed in a heating chamber by detecting a voltage produced from a piezoelectric transducer element under a plate supporting the object.

It is a further object of the present invention to provide a weight measuring device which is provided with an output voltage control circuit so that the variations in the outputs from the piezoelectric transducer element can be reduced.

It is still a further object of the present invention to provide an attachment construction of a piezoelectric transducer element which accurately outputs a voltage according to the weight of an object to be measured.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a weight measuring device comprises piezoelectric transducer means for outputting a voltage indicative of the weight of an object, and detecting means for detecting the weight of the object based on the voltage from the piezoelectric transducer means.

Further, one of the embodiments of the present invention will be described. A weight measuring device for a heating appliance comprises a heating chamber dispoding containing an object to be heated therein, the heating chamber having a bottom plate, turntable means disposing an object thereon, for rotating on an upper surface of the bottom plate of the heating chamber, the turntable means having rollers, the rollers providing a stress on the bottom plate by rotating itself, piezoelectric transducer means disposed on the rear surface of the bottom plate of the heating chamber corresponding to the locus of at least one of the rollers, for outputting a voltage indicative of the weight of the object, detecting means for detecting the voltage from the piezoelectric transducer means, and weight measuring means for measuring the weight of the object on the turntable based on the output of the detecting means.

The weight measuring device may include output controlling means for controlling the output from the piezoelectric transducer means, the controlling means including a resistance connected to the piezoelectric transducer means in parallel.

The turntable means may comprise a turntable member for disposing the object thereon, and support means for supporting the turntable member and for coupling to a rotating axis of a motor.

The piezoelectric transducer means may comprise a base electrode, a piezoelectric ceramic, and an evaporated electrode with these elements being successively layered.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 4 shows a sectional view of a piezoelectric transducer element used in the weight measuring device for the microwave oven of FIG. 1;

FIG. 5 shows a waveform of an output voltage from the piezoelectric transducer element of FIG. 4;

FIG. 6 shows a circuit diagram of a C-R noise filter circuit for the output voltage from the piezoelectric transducer element;

FIG. 11 shows an enlarged sectional view of a turntable portion of the microwave oven including a weight measuring device according to another embodiment of the present invention.

DETAILED DESCRIPTION OF THE PREFERRED EMBODIMENTS

A preferred embodiment of the present invention is now described in terms of a microwave oven although not limited to the microwave oven. Although a microwave oven of a turntable type is used in an embodiment of the present invention, a weight measuring device of the present invention may be applied to various apparatuses, for example, a microwave oven without any turntable, other than the microwave oven illustrated.

Figure 1:
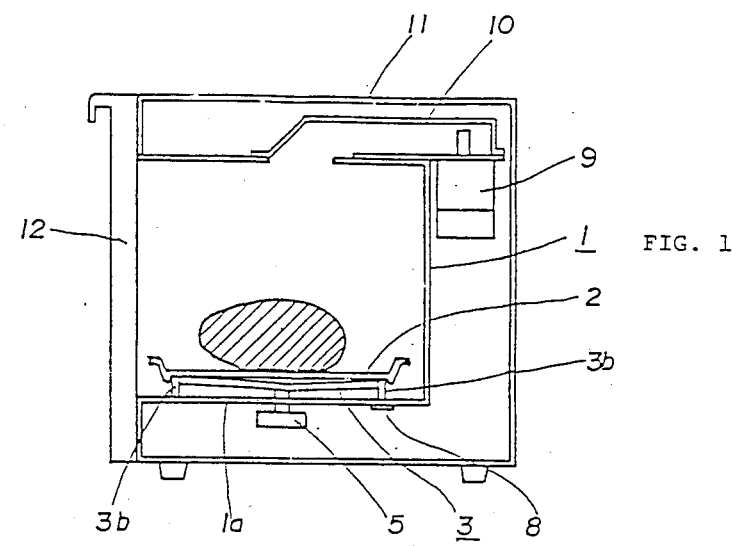
FIG. 1 shows a sectional view of a microwave oven including a weight measuring device according to an embodiment of the present invention.
Figure 2:
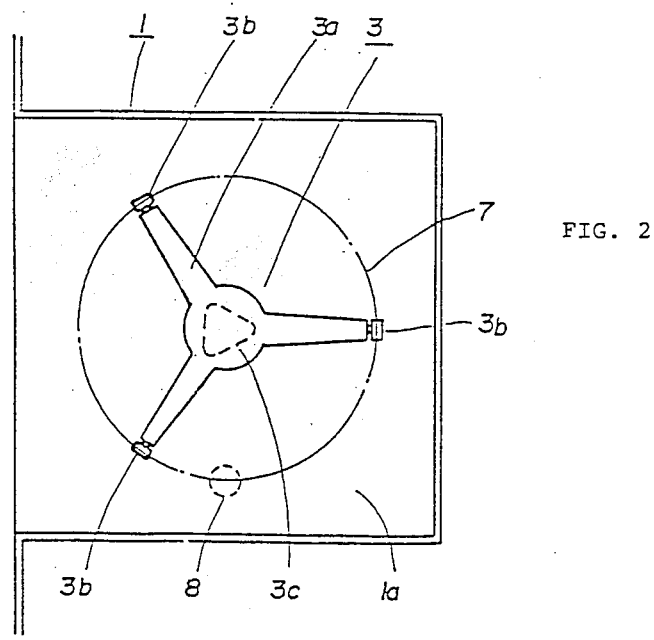
FIG. 2 shows a plan view of a bottom plate in a heating chamber of the microwave oven of FIG. 1 when a turntable is removed.
Figure 3:
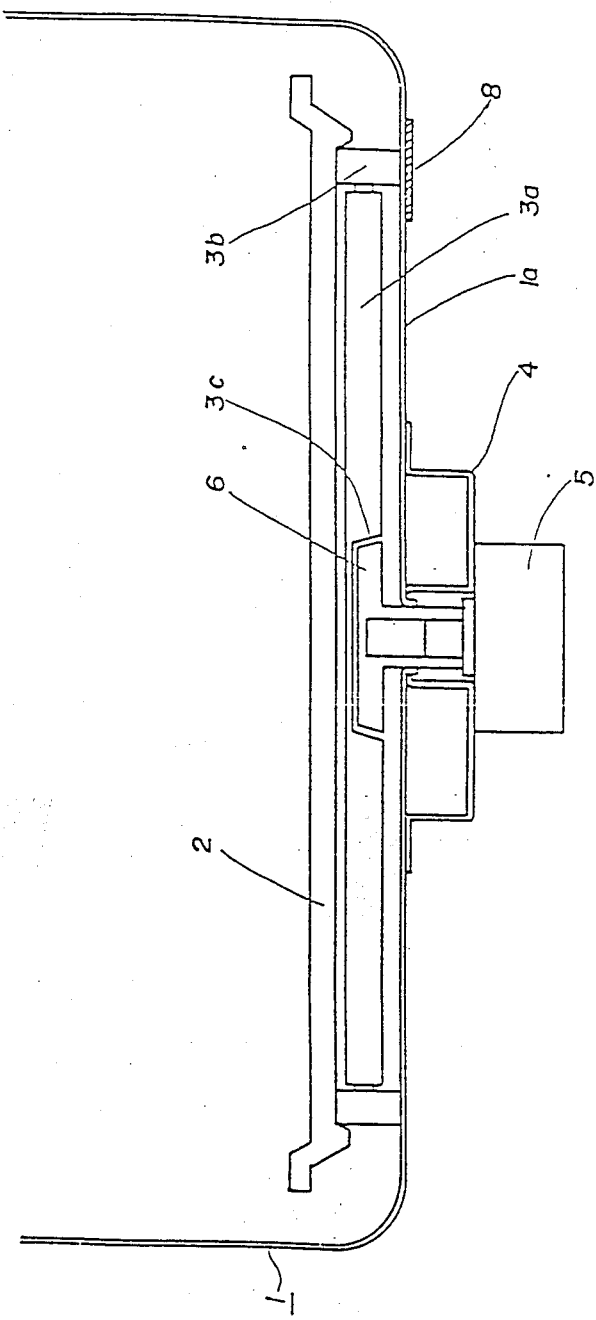
FIG. 3 shows an enlarged sectional view of a turntable portion in the microwave oven of FIG. 1.

FIG. 1 shows a sectional view of a microwave oven of a turntable type, including a weight measuring device according to an embodiment of the present invention. FIG. 2 shows a plan view of a bottom plate in a heating chamber of the microwave oven of FIG. 1 when a turntable is removed. FIG. 3 shows an enlarged sectional view of a turntable portion of the microwave oven of FIG. 1. A turntable 2 is provided in a heating chamber 1 of the microwave oven. An object to be heated is disposed on the turntable 2. The turntable 2 is supported by a base means or support member 3. The support member 3 is trifurcate, and comprises three arms 3a, and three rollers rotatably connected to and coupled with the ends of the arms 3a, respectively. The rollers 3b, with the the support member 3, are rotated on upper surface of the the bottom plate 1a of the heating chamber 1. The support member 3 is rotated by a turntable motor 5 provided on the rare surface of the bottom plate 1a of the heating chamber 1 by an angle 4. Therefore, the turntable 2 is rotated by the turntable motor 5 via the support member 3 when the heating is carried out.

A coupling 6 is connected to a rotating axis of the turntable motor 5. A coupling portion 3c is provided on the support member 3. Therefore, the coupling 6 connected to the motor 5 is removably engaged and coupled with the coupling portion 3c of the support member 3. Accordingly, the rotating power of the motor 5 is introduced to the support member 3 so that the turntable 2 is rotated. In this case, each of the rollers 3b of the support member 3 is rotated along the same curve on the upper surface of the bottom plate 1a of the heating chamber 1. The rollers 3b provide the same locus 7 indicated by a one dot chain line as shown in FIG. 2.

A piezoelectric transducer element 8 is provided at one portion on the rear surface of the bottom plate 1a of the heating chamber 1 corresponding to the locus of the rollers 3b of the support member 3. In other words, the piezoelectric transducer element 8 is provided under the locus of the rollers 3b.

A magnetron 9 generating microwaves is provided on the upper and back sides of the heating chamber 1. A waveguide 10 is provided for introducing the microwaves from the magnetron 9 into the heating chamber 1. The components for the microwave oven such as the heating chamber 1, the turntable 2, the magnetron 9, the waveguide 10, a heater (not shown), a cooling fan (not shown) or the like, are provided in a housing cabinet 11. A microwave oven door 12 is provided for closing and opening the heating chamber 1.

The piezoelectric transducer element 8 comprises a base electrode 8a, a piezoelectric ceramic 8b, and an evaporated electrode 8c. The base electrode 8a, the piezoelectric ceramic 8b, and the evaporated electrode 8c are successively layered as shown in FIG. 4. The piezoelectric element 8 is adhered on the rear surface of the bottom plate 1a of the heating chamber 1 corresponding to the locus 7 of the rollers 3b. Therefore, the piezoelectric transducer element 8 outputs a voltage as shown in FIG. 5 when one of the rollers 3b of the support member 3 is passed on the upper surface of the bottom plate 1a corresponding to the rear surface to which the piezoelectric transducer element 8 is adhered thereon. Wirings are designated by 8d.

Figure 7:
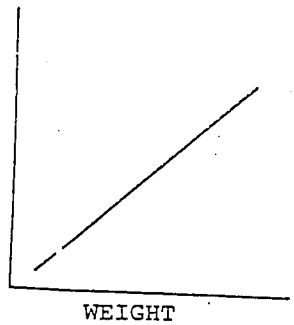
FIG. 7 shows a relationship between a weight of an object and an average value of output peak voltages.

The piezoelectric transducer element 8 is connected to a C-R noise filter as shown in FIG. 6. The peak value V1 of each of waveforms of the output voltages from the piezoelectric transducer element 8 is applied to a peak detecting circuit through the C-R noise filter circuit. The noise filter circuit comprises a resistance R and a capacitance C as shown in FIG. 6 The detection of the peak detecting circuit is carried out several times. The peak values detected by the peak detecting circuit are averaged to make an average peak value. The average peak value is proportionate to the weight of the object to be heated as shown in FIG. 7.

The peak detecting circuit is operated as follows. When the rollers 3b are moved on the locus 7 of the rollers 3b and one of the rollers is passed on the upper surface of the bottom plate corresponding to the rear surface of the bottom plate to which the piezoelectric transducer element 8 is adhered, the shape of the bottom plate 1b of the heating chamber 1 is changed according to the weight of the object disposed on the turntable 2 and the weight of the turntable 2 applied to the rollers 3b of the support member 3. According to the weight of the object and the weight of the turntable, the rollers provide a stress on the bottom plate 1a of the heating chamber 1, and the piezoelectric transducer element 8 can output a voltage as shown in FIG. 5. The voltage is amplified by an amplifier through the noise filter. To detect the peak value, there may be an integrator and a negative-feedback amplifier. The detected analog peak value is applied to a microcomputer 13. The analog peak value of the waveform of the amplified voltage is converted into a digital value by an analog/digital convertor. The converted peak value is stored in a memory. The above operation is carried out a predetermined number of times. The stored peak values are averaged to calculate the average peak value. The weight of the object is thus judged based on the average peak value as shown in FIG. 7.

Figure 8:
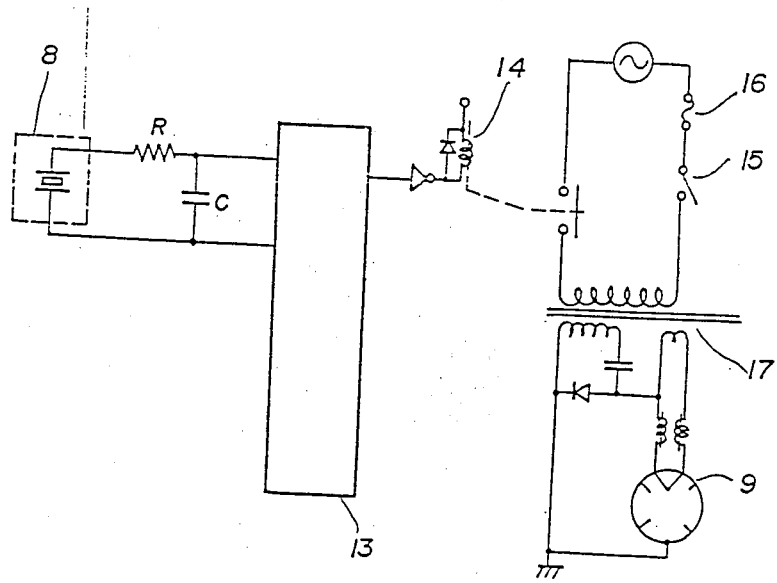
FIG. 8 shows a circuit diagram of a magnetron control circuit used in the microwave oven of FIG. 1.

FIG. 8 shows a circuit for controlling the magnetron 9 according to the weight of the object measured. The output voltage from the piezoelectric transducer element 8 is applied to the microcomputer 13 via the noise filter and the peak detecting circuit. The microcomputer 13 detects the output voltage peak values a predetermined number of times and calculates the weight of the object according to the average value from the output voltage peak values. After the weight of the object is thus calculated and measured, the microcomputer 13 controls the magnetron 9 via a relay 14 so as to heat the object on the turntable 2 in accordance with the weight of the object. A heating start switch is designated by 15, a fuse is designated by 16, and a high voltage transformer is designated by 17. The heating start switch is provided on a control panel.

As described above, the construction of the weight measuring device of the present invention can be simplified. The number of components can be reduced, thus requiring little labor for assembly. Although the object is disposed on a table such as a turntable, the difference of the detection by every of the rollers regardless of an unbalanced load and a balanced load can be decreased because the output voltage peak value from the piezoelectric transducer element 8 is detected a predetermined number of times and the weight of the object is judged according to the average peak value from the plurality of peak values. Therefore, the weight of the object can be accurately measured.

Although, in the embodiment, the single piezoelectric transducer element 8 is used, a plurality of piezoelectric transducer elements may be used so that the measuring and detecting accuracy is remarkably increased. For example, the number of the piezoelectric elements may be the same as the number of the rollers 3b of the support member 3. Although the rollers 3b are rotated on the same locus, the rollers may be rotated on the different loci by changing the positions of the rollers. Each of the piezoelectric elements may be positioned according to the locus of each of the rollers of the support member. The turntable may be integrally provided with the support member.

The shape of the support member 3 should not be limited to the trifurcate form. The number of the arms of the support member 3 may be increased so as to increase the number of rollers 3b. Also, the piezoelectric transducer element can be fixed and connected on the rear surface of the bottom plate of the heating chamber by screws instead of by adhesion.

The outputs of the piezoelectric transducer element 8 may be varied by the attachment of the piezoelectric transducer element 8 on the rear surface of the bottom plate 1a in the heating chamber 1 and the performance of the piezoelectric transducer element itself. The variations of the outputs must be controlled so that high accuracy the weight measuring is possible. Therefore, the output voltage control means may be provided for controlling the output voltage from the piezoelectric transducer element 8 as described below.

Figure 9:
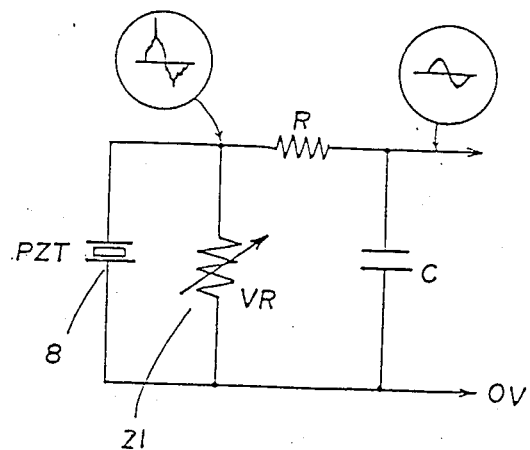
FIG. 9 shows a circuit diagram of an output voltage control means for the piezoelectric transducer element.
Figure 10:
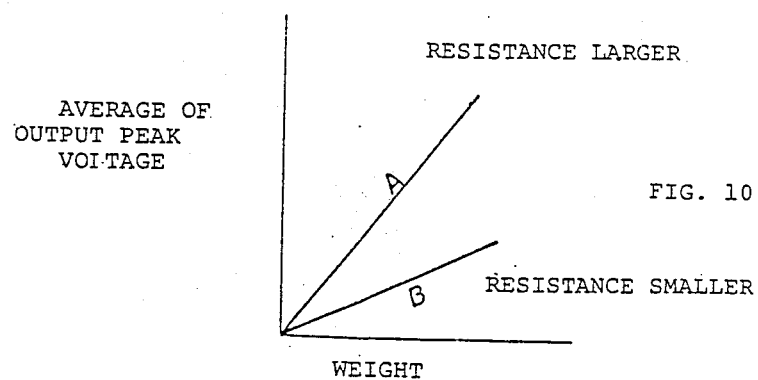
FIG. 10 shows a relationship between an average value of output peak voltages from the output voltage control means and the weight of the object.

FIG. 9 shows a circuit diagram of an output voltage control means which can be used in the weight measuring device of the present invention. A variable resistance 21 (VR) is connected between the electrodes of the piezoelectric transducer element 8. The variable resistance 21 is provided in the control panel portion (not shown) of the microwave oven. The values of the variable resistance 21 can be easily changed. When the value of the variable resistance 21 is decreased from a large resistance to a small resistance (resistance larger→resistance smaller), the relationship between the weight of the object and the output voltage from the piezoelectric transducer element 8 is changed as shown in FIG. 10 (The line A is converted into the line B). Because the relationship between the weight of the object and the output voltage from the piezoelectric transducer element 8 can be changed, the variations of the outputs of the piezoelectric transducer element 8 can be reduced. As the variable resistance of the output voltage control means is provided in the control panel portion, the value of the resistance can be easily controlled from the control panel portion. The control panel portion is provided on the front of the microwave oven, and comprises a heating time switch for setting a heating period of time, a temperature selection switch for setting or selecting a heating temperature, the heating start switch or the like. Because the output voltage control means comprises the variable resistance 21 connected to the piezoelectric transducer element in parallel, the costs of the weighing member can be reduced.

As, in the first embodiment, the piezoelectric transducer element is adhered to the rear surface of the bottom plate in the heating chamber, the output of the piezoelectric transducer element 8 may be varied according to the amount of the adhesive or the adhesive condition between the piezoelectric transducer element and the bottom plate. As a result, the weight measuring accuracy may be decreased. Therefore, the piezoelectric transducer element 8 may be pressed on the rear surface of the bottom plate in the heating chamber 1 as shown in FIG. 11. FIG. 11 shows an enlarged sectional view of a turntable portion of the microwave oven according to another embodiment of the present invention.

An attachment metal member 18 is provided for disposing the piezoelectric transducer element 8 on the rear surface of the bottom plate 1a in the heating chamber 1. The attachment member 18 has a flange 18c, and an opening 18a surrounded by the frange 18c. The frange 18c has aperatures for screws 20. The opening 18a is larger than that of the piezoelectric transducer element, and faced and positioned at the predetermined portion of the rear surface of the bottom plate 1a in the heating chamber 1 corresponding to the locus of the rollers. The attachment 18 is welded to the bottom plate by a spot welding method. A press member 19 is provided for pressing the piezoelectric transducer element 8 in the direction of the bottom plate. The press member 19 has an opening 19a at the central portion. The edges facing the opening 19a are expanded towards the bottom plate 1a to press the element 8. The attachment of the piezoelectric element is as follows. After the piezoelectric element 8 is inserted into the opening 18a of the attachment member 18 connected to the bottom plate 1b, the press member 19 is fixed to the attachment member 18 by screws 20 so as to press the piezoelectric element 8. The piezoelectric element 8 is pressed with a constant pressure by the expanded edges of the press member 19 on the rear surface of the bottom plate 1a corresponding to the locus of the rollers 3b on the upper surface of the bottom plate 1a in the heating chamber 1. As a strain in proportion to the weight of the object is produced on the element 8 by the opening 19a of the press member 19, and the output voltage can be produced without variations. The press attachment in place of the adhesion of the element may be easily assemblied, and provides sure attachment with repeated loads of the rollers greater than that of the adhesion.

As described above, in a weight measuring device of the present invention, the support rollers supporting the turntable are rotated on the upper surface of the bottom plate in the heating chamber. The piezoelectric transducer element is disposed on a rear surface of the bottom plate corresponding to the locus of the support rollers on the upper surface of the bottom plate, producing the stress thereon according to rotation of the rollers. The voltage from the piezoelectric transducer element is detected when the support rollers are rotated on the upper surface of the bottom plate. The weight of the object disposed on the turntable is exactly detected and measured based on the output voltage from the element. The construction of the weight measuring device can be simplified. The number of components can be reduced. Therefore, the costs of the weight measuring device can be reduced.

Also, if the output voltage controlling means is provided for controlling the output voltage from the piezoelectric transducer element, the variations of the output voltages from the piezoelectric element can be reduced. The weight measuring device of the present invention can measure the weight of the object with high accuracy.

The piezoelectric element may be adhered to the rear surface of the bottom plate in the heating chamber, or may be pressed on the rear surface of the bottom plate in the heating chamber.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A weight measuring device for a heating appliance comprising:
    table means for supporting an object thereon;
    base means for supporting the table means;
    a bottom plate that supports said base means on a top surface thereof;
    piezoelectric transducer means disposed adjacent a locus of the base means on said bottom plate support and on a bottom surface of said bottom plate, for outputting a voltage indicative of the weight of the object;
    detecting means for detecting the voltage from the piezoelectric transducer means; and
    weight measuring means for measuring the weight of the object based on the output of the detecting means.

2. The weight measuring device of claim 1, further comprising:
    output controlling means for controlling the output from the piezoelectric transducer means.

3. The weight measuring device of claim 2, wherein the output controlling means comprises a resistance connected to the piezoelectric transducer means in parallel.

4. The weight measuring device of claim 2, wherein the output controlling means is externally controlled.

5. The weight measuring device of claim 1, wherein the turntable means comprises a turntable member for disposing the object thereon, and support means for supporting the turntable member and for coupling to a rotating axis of a motor.

6. The weight measuring device of claim 5, wherein the support member comprises arms extended in a radial manner, the rollers rotatably coupled to the arms, respectively, and a coupling member for coupling the support member to the motor.

7. The weight measuring device of claim 1, wherein the piezoelectric transducer means is adhered to the rear surface of the bottom plate of the heating chamber.

8. The weight measuring device of claim 1, wherein the piezoelectric transducer means is in pressure contact with the rear surface of the bottom plate of the heating chamber.

9. The weight measuring device of claim 1, wherein the piezoelectric transducer means comprises a base electrode, a piezoelectric ceramic, and an evaporated electrode, these elements being successively layered.

10. The weight measuring device of claim 1, wherein the piezoelectric transducer means is connected to a noise filter including a resistance and a capacitance.

11. The weight measuring device of claim 1, wherein said piezoelectric transducer means comprises a plurality of piezoelectric stress sensors, the number of piezoelectric stress sensors being equal to the number of rollers of said turntable means, each one of said plurality of piezoelectric stress sensors being disposed on said rear surface of the bottom plate in a position corresponding to the locus of at least one of said rollers.

12. The weight measuring device of claim 11 wherein said weight measuring means calculates an average voltage from a predetermined number of voltages from the piezoelectric transducer means, the voltages being detected by said detecting means, determining a weight corresponding to said average voltage, and outputting said weight corresponding to said average voltage as the weight of said object.

13. The weight measuring device of claim 1, wherein said weight measuring means calculates an average voltage from a predetermined number of voltages from the piezoelectric transducer means, the voltages being detected by said detecting means, determining a weight corresponding to said average voltage, and outputting said weight corresponding to said average voltage as the weight of said object.

14. A weight measuring device for a heating appliance comprising:
    a heating chamber in which an object that is to be heated can be disposed the heating chamber having a bottom plate;
    turntable means, upon which the object can be disposed, for rotating on an upper surface of the bottom plate of the heating chamber, the turntable means having a plurality of rollers, providing a stress on the bottom plate by its rotation;
    piezoelectric transducer means disposed on the rear surface of the bottom plate of the heating chamber corresponding to the locus of at least one of the rollers, for outputting a voltage indicative of the weight of the object;
    detecting means for detecting the voltage from the piezoelectric transducer means; and
    weight measuring means for measuring the weight of the object on the turntable based on the output of the detecting means.

15. The weight measuring device of claim 14, further comprising:
    output controlling means for controlling the output from the piezoelectric transducer means.

16. The weight measuring device of claim 15, wherein the output controlling means comprises a resistance connected to the piezoelectric transducer means in parallel.

17. The weight measuring device of claim 15 wherein the output controlling means is externally controlled.

18. The weight measuring device of claim 14, wherein the turntable means comprises a turntable member for disposing the object thereon, and support means for supporting the turntable member and for coupling to a rotating axis of a motor.

19. The weight measuring device of claim 18, wherein the support member comprises arms extended in a radial manner, the rollers rotatably coupled to the arms, respectively, and a coupling member for coupling the support member to the motor.

20. The weight measuring device of claim 14, wherein the piezoelectric transducer means is adhered to the rear surface of the bottom plate of the heating chamber.

21. The weight measuring device of claim 14, wherein the piezoelectric transducer means is in pressure contact with the rear surface of the bottom plate of the heating chamber.

22. The weight measuring device of claim 14, wherein the piezoelectric transducer means comprises a base electrode, a piezoelectric ceramic, and an evaporated electrode, these elements being successively layered.

23. The weight measuring device of claim 14, wherein the piezoelectric transducer means is connected to a noise filter including a resistance and a capacitance.

24. The weight measuring device of claim 14 wherein said piezoelectric transducer means comprises a plurality of piezoelectric stress sensors, the number of piezoelectric stress sensors being equal to the number of rollers of said turntable means, each of said plurality of piezoelectric stress sensors being disposed on said rear surface of the bottom plate in a position corresponding to the locus of at least one of said rollers.

25. The weight measuring device of claim 24 wherein said weight measuring means calculates an average voltage from a predetermined number of voltages from the piezoelectric transducer means, the voltages being detected by said detecting means, determining a weight corresponding to said average voltage, and outputting said weight corresponding to said average voltage as the weight of said object.

26. The weight measuring device of claim 14 wherein said weight measuring means calculates an average voltage from a predetermined number of voltages from the piezoelectric transducer means, the voltages being detected by said detecting means, determining a weight corresponding to said average voltage, and outputting said weight corresponding to said average voltage as the weight of said object.

27. The weight measuring device of claim 26, further comprising:
output controlling means for controlling the output from the piezoelectric transducer means.

28. The weight measuring device of claim 27, wherein the turntable means comprises a turntable member for disposing the object thereon, and support means for supporting the turntable member and for coupling to a rotating axis of a motor.

29. The weight measuring device of claim 28, wherein the support member comprises arms extended in a radial manner, the rollers rotatably coupled to the arms, respectively, and a coupling member for coupling the support member to the motor.

30. The weight measuring device of claim 29, wherein the piezoelectric transducer means is adhered to the rear surface of the bottom plate of the heating chamber.

31. The weight measuring device of claim 29, wherein the piezoelectric transducer means comprises a base electrode, a piezoelectric ceramic, and an evaporated electrode, these elements being successively layered.

32. The weight measuring device of claim 29, wherein the piezoelectric transducer means is in pressure contact with the rear surface of the bottom plate of the heating chamber.

33. The weight measuring device of claim 29, wherein the piezoelectric transducer means is connected to a noise filter including a resistance and a capacitance.

34. The weight measuring device of claim 33 wherein said output controlling means comprises a variable resistance connected to said piezoelectric transducer means, said variable resistance being externally controllable.

* * * * *